United States Patent
Tanaka et al.

(10) Patent No.: US 6,617,955 B2
(45) Date of Patent: Sep. 9, 2003

(54) POSITIVE TEMPERATURE COEFFICIENT THERMISTOR

(75) Inventors: Hiroki Tanaka, Yokaichi (JP); Yoshinori Kitamura, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/050,921

(22) Filed: Jan. 22, 2002

(65) Prior Publication Data

US 2002/0118092 A1 Aug. 29, 2002

(30) Foreign Application Priority Data

Feb. 23, 2001 (JP) .................................. 2001-048563

(51) Int. Cl.[7] ............................................... H01C 7/10
(52) U.S. Cl. .................. 338/22 R; 338/234; 338/235; 338/236
(58) Field of Search ...................... 338/22 R, 225 D, 338/234, 235, 236

(56) References Cited

U.S. PATENT DOCUMENTS

| | | | | | |
|---|---|---|---|---|---|
| 4,325,051 A | * | 4/1982 | Rodriguez | ................ | 338/22 R |
| 4,395,623 A | * | 7/1983 | Shimada et al. | .......... | 338/22 R |
| 5,142,265 A | * | 8/1992 | Motoyoshi et al. | ....... | 338/22 R |
| 5,153,555 A | * | 10/1992 | Enomoto et al. | ......... | 338/22 R |
| 5,233,326 A | * | 8/1993 | Motoyoshi | ................ | 338/22 R |
| 5,714,924 A | * | 2/1998 | Takeuchi et al. | .......... | 338/22 R |
| 5,760,336 A | * | 6/1998 | Wang | ....................... | 338/22 R |
| 5,909,168 A | * | 6/1999 | Miyasaka et al. | ......... | 338/22 R |
| 6,025,771 A | * | 2/2000 | Kobayashi et al. | ....... | 338/22 R |
| 6,236,550 B1 | * | 5/2001 | Mochida et al. | .......... | 338/22 R |
| 6,242,998 B1 | * | 6/2001 | Mihara | ..................... | 338/22 R |

FOREIGN PATENT DOCUMENTS

| | | | | | |
|---|---|---|---|---|---|
| JP | 3141602 | * | 3/1991 | ............... | 338/22 R |
| JP | 5258905 | * | 5/1993 | ............... | 338/22 R |

* cited by examiner

*Primary Examiner*—Karl D. Easthom
(74) *Attorney, Agent, or Firm*—Keating & Bennett, LLP

(57) ABSTRACT

An inexpensive positive temperature coefficient thermistor has metal terminals which have been miniaturized without deteriorating the characteristics or sacrificing the reliability of the device. The metal terminals include supporting members and springs constructed such that a total width of the supporting members is smaller than a total width of the springs. In addition, connecting portions at the upper ends of the metal terminals engage with a case main body or a covering member to be retained at predetermined positions.

19 Claims, 7 Drawing Sheets

POSITIVE TEMPERATURE COEFFICIENT THERMISTOR

BACKGROUND OF THE INVENTION

1. Field of the Invention

The present invention relates to positive temperature coefficient thermistors preferably for use in demagnetizing circuits included in electric appliances such as color television sets. More particularly, the present invention relates to positive temperature coefficient thermistors, in each of which a positive temperature coefficient thermistor element supported by metal terminals is included in a case and portions of the metal terminals extend outside of the case.

2. Description of the Related Art

FIG. 6 shows a positive temperature coefficient thermistor of the two-terminal type as an example of the related art. In this positive temperature coefficient thermistor, a positive temperature coefficient thermistor element 22 is supported by a pair of metal terminals 23a and 23b and is contained in a plastic case 21.

The case 21 includes a main body 24 having an open top portion and a cover member 25 attached to an opening 24a of the main body 24.

The metal terminals 23a and 23b are formed from a metal plate having a spring-like property. As shown in FIGS. 6 and 7, the metal terminals 23a and 23b include two springs 26a and 26b supporting the positive temperature coefficient thermistor element 22 interposed therebetween, supporting members 27a and 27b supporting the springs 26a and 26b, and connecting terminals 28 extending from the supporting members 27a and 27b. One end of each connecting terminal 28 passes through each slit 24b formed in the bottom of the main body 24 so as to extend outside the case 21.

In the metal terminals 23a and 23b, the springs 26a and 26b are supported by the two supporting members 27a and 27b disposed at each side, as shown in FIG. 7.

Additionally, the metal terminals 23a and 23b have the following arrangements:

(1) The supporting members 27a and 27b securely support the springs 26a and 26b so that the springs 26a and 26b can securely support the positive temperature coefficient thermistor element 22 interposed therebetween.

(2) Widths W1 and W2 of the springs 26a and 26b are set appropriately and a total value of widths W3 and W4 of the supporting members 27a and 27b is larger than a total value of the widths W1 and W2 of the springs 26a and 26b. With this arrangement, the springs 26a and 26b can have necessary spring thrusting forces and portions of the springs 26a and 26b in contact with the positive temperature coefficient thermistor element 22 have sufficient current capacity.

In this case, the widths W1 and W2 of the springs 26a and 26b are 1.5 mm and the widths W3 and W4 of the supporting members 27a and 27b are 1.9 mm.

When the total value of the widths W3 and W4 of the supporting members 27a and 27b is smaller than the total value of the widths W1 and W2 of the springs 26a and 26b, the supporting members 27a and 27b are deformed near the base ends of the springs due to the thrusting forces of the springs 26a and 26b. Consequently, satisfactory spring characteristics cannot be obtained. In addition, when the widths W1 and W2 of the springs 26a and 26b are too narrow, it is impossible to obtain both the necessary spring thrusting force and the current capacity of the portions of the springs 26a and 26 in contact with the positive temperature coefficient thermistor element 22.

Recently, there has been a growing demand for cost reduction in electric apparatuses. With this tendency, there has also been a strong demand for cost reduction in demagnetizing positive temperature coefficient thermistors used in electric apparatuses such as color television sets. In order to meet these demands, the sizes of metal terminals defining positive temperature coefficient thermistors and the cost thereof need to be reduced. However, for the reasons described above, it is difficult to miniaturize the metal terminals, with the result that cost reduction in such a positive temperature coefficient thermistor cannot be sufficiently achieved.

As another example of the related art, FIG. 8 shows a positive temperature coefficient thermistor of the three-terminal type, which includes two positive temperature coefficient thermistor elements 22a and 22b and a planar terminal 29 disposed therebetween. The positive temperature coefficient thermistor has the same problems as those shown in the positive temperature coefficient thermistor of the two-terminal type described above. In FIG. 8, elements having the same reference numerals as those used in FIGS. 6 and 7 represent the same or equivalent parts shown in FIGS. 6 and 7.

SUMMARY OF THE INVENTION

In order to overcome the problems described above, preferred embodiments of the present invention provide a highly compact and very inexpensive positive temperature coefficient thermistor including miniaturized metal terminals while maintaining the characteristics and reliability of the device.

According to one preferred embodiment of the present invention, a positive temperature coefficient thermistor includes a positive temperature coefficient thermistor element, a case including a main body having an open top portion and construct to house the positive temperature coefficient thermistor element and a cover member arranged to cover the open top portion of the main body, and at least one pair of metal terminals including springs downwardly extending from connecting portions at the upper ends of the springs to be kept in contact with the positive temperature coefficient thermistor element by spring thrusting forces so as to obtain electrical continuity to the element and supporting the positive temperature coefficient thermistor element interposed between the springs to retain the positive temperature coefficient thermistor element inside the case, supporting members having upper ends that are integrated with the connecting portions to support the springs, and connecting terminals arranged to extend through slits provided in the bottom of the case and so as to extend outside the case. In this positive temperature coefficient thermistor according to this preferred embodiment, a total width value of the supporting members is preferably smaller than a total width value of the springs and the connecting portions at the upper ends of the springs engage with one of the main body and the cover member so that the connecting portions are retained at predetermined positions.

As described above, the metal terminals have the springs supporting the positive temperature coefficient thermistor element interposed therebetween, at least one supporting member supporting each of the springs, and the connecting terminals passing through the slits formed in the bottom of the main body of the case so as to extend outside the case. Additionally, the total width value of the supporting members is preferably smaller than the total width value of the springs. Additionally, the connecting portions at the upper ends of the metal terminals engage with the main body or the cover member to be retained at the predetermined positions. With this arrangement, deformation of the supporting members is reliably prevented. Thus, the metal terminals can be miniaturized without sacrificing the reliability required when retaining the positive temperature coefficient thermistor element and the reliability of electrical continuity to the positive temperature coefficient thermistor element. As a result, the entire positive temperature coefficient thermistor can be produced at much lower cost.

In other words, in the positive temperature coefficient thermistor according to preferred embodiments of the present invention, the connecting portions at the upper ends of the metal terminals engage with the main body or the cover member to be retained at predetermined positions. Accordingly, even when the metal terminals are miniaturized by setting the widths of the supporting members to be smaller than the widths of the springs, deformation of the supporting members is reliably prevented. Thus, since the supporting members can support the springs securely, the reliability required when supporting the positive temperature coefficient thermistor element, the reliability of electrical continuity to the positive temperature coefficient thermistor element, and the current capacity of contacting portions can be securely obtained.

In addition, in this positive temperature coefficient thermistor according to another preferred embodiment of the present invention, the connecting portions of the metal terminals preferably engage with the main body or the cover member to be retained in the predetermined positions. Thus, for example, when compared with the case in which the supporting members of the metal terminals are insert-molded inside the main body, the entire structure of the device and its manufacturing process is greatly simplified. Accordingly, in this respect, also, further cost reduction can be achieved.

In terms of the positive temperature coefficient thermistor, when there are provided a plurality of supporting members and a plurality of springs, the total width value of the supporting members and the total width value of the springs are equivalent to a sum of the widths of the plurality of the supporting members and a sum of the widths of the plurality of the springs. When there is provided a single supporting member and a single spring, the total width is equivalent to each of the width of the single supporting member and the width of the springs.

Furthermore, in the positive temperature coefficient thermistor of preferred embodiments of the present invention, each of the metal terminals may include two or more springs and supporting members that are fewer in number than the springs.

With this arrangement, the metal terminals can be sufficiently miniaturized. Furthermore, when each of the metal terminals has two or more springs, the reliability required when retaining the positive temperature coefficient thermistor element and the reliability of electrical continuity to the positive temperature coefficient thermistor element can be maintained without fail.

In addition, alternatively, in this positive temperature coefficient thermistor, while using the equal numbers of the springs and the supporting members, the total width value of the supporting members may be preferably smaller than the total width value of the springs.

Furthermore, each of the metal terminals may be preferably formed by stamping out a metal plate having a spring-like property.

When using the metal terminals formed of such a metal plate, the positive temperature coefficient thermistor can obtain the reliability required when retaining the positive temperature coefficient thermistor element and the reliability of electrical continuity to the positive temperature coefficient thermistor element at low cost. Thus, even more advantages can be achieved with preferred embodiments of the present invention.

Furthermore, the positive temperature coefficient thermistor element may be a demagnetizing positive temperature coefficient thermistor element for use in, for example, a demagnetizing circuit.

Such a demagnetizing positive temperature coefficient thermistor included in a demagnetization circuit is usually incorporated in a home electronic apparatus such as a color television set. Thus, cost reduction in the demagnetizing positive temperature coefficient thermistors is more strongly demanded. With the use of a demagnetizing positive temperature coefficient thermistor according to preferred embodiments of the present invention, the positive temperature coefficient thermistor can be produced at very low cost without sacrificing the reliability of the device.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
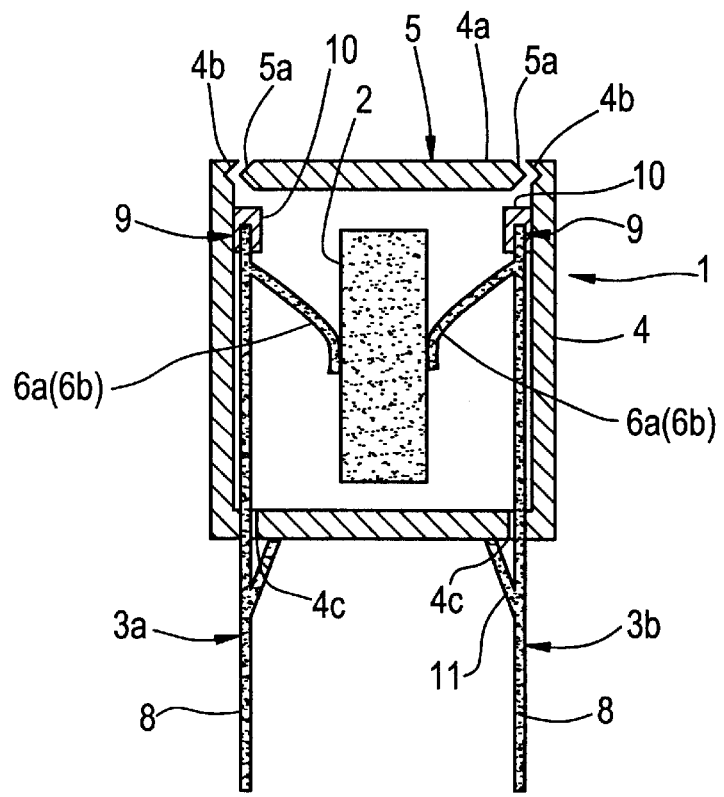
FIG. 1 is a front sectional view of a positive temperature coefficient thermistor according to a preferred embodiment of the present invention.

Now, a detailed explanation of a preferred embodiment of the present invention will be provided referring to the drawings.

Figure 2:
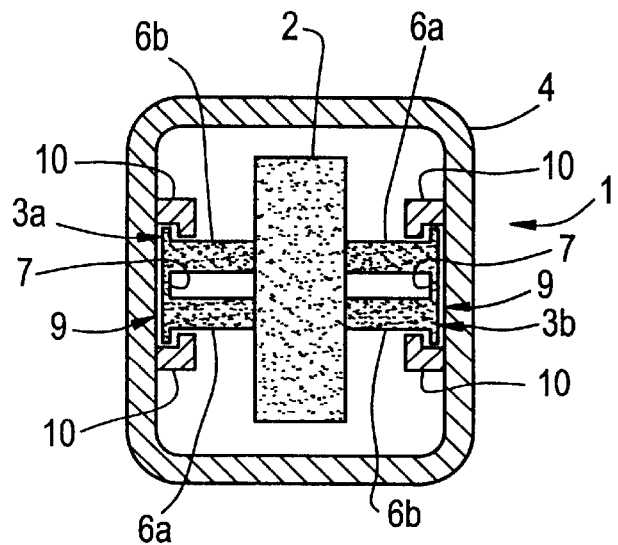
FIG. 2 is a planar sectional view of the positive temperature coefficient thermistor of FIG. 1.
Figure 3:
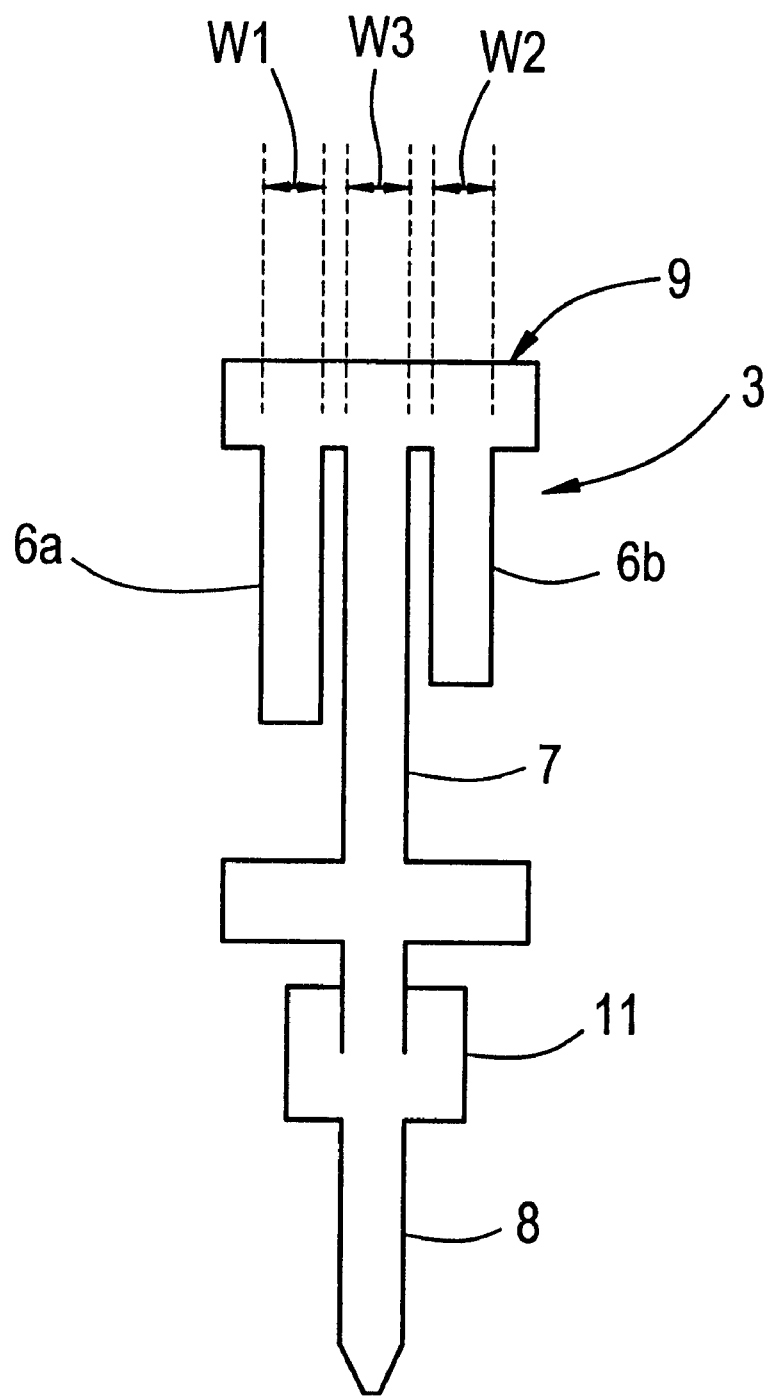
FIG. 3 is an illustration of metal terminals used in the positive temperature coefficient thermistor of FIG. 1.

FIG. 1 shows a front sectional view of a positive temperature coefficient thermistor according to a preferred embodiment of the present invention. FIG. 2 shows a planar sectional view of the positive temperature coefficient thermistor. FIG. 3 illustrates metal terminals included in the positive temperature coefficient thermistor.

The positive temperature coefficient thermistor is preferably a demagnetizing positive temperature coefficient thermistor for use in, for example, a demagnetizing circuit incorporated in a color television set or other suitable electronic apparatus. As shown in FIGS. 1 and 2, this positive temperature coefficient thermistor is preferably a positive temperature coefficient thermistor of the two terminal type, in which a plastic case 1 includes therein a positive temperature coefficient thermistor element 2 supported by a pair of metal terminals 3a and 3b.

In the positive temperature coefficient thermistor of the present preferred embodiment, the case 1 includes a main body 4 having an open top portion and a cover member 5 arranged to cover the opening 4a of the main body 4. On the inner walls of the opening 4a of the main body 4, engaging grooves 4b are formed to engage with sharpened edge-like peripheral portions 5a of the cover member 5. The peripheral portions 5a of the cover member 5 engage in the engaging grooves 4b so that the cover member 5 covers the opening 4a of the main body 4.

As shown in FIGS. 1 to 3, each of the metal terminals 3a and 3b preferably includes two springs 6a and 6b having different lengths, which support the positive temperature coefficient thermistor element, a supporting member 7 arranged between the two springs 6a and 6b to support them, and a connecting terminal 8 extending from the supporting member 7 and passing through a slit 4c formed in the bottom of the main body 4 so as to extend outside the case 1.

In each of the metal terminals 3a and 3b, the springs 6a and 6b extend downwardly from a connecting portion 9 arranged at the upper ends of the springs 6a and 6b. The upper end of the supporting member 7 is integrated with the connecting portion 9 to support the springs 6a and 6b via the connecting portion 9.

In each of the metal terminals 3a and 3b, the springs 6a and 6b have different lengths. This arrangement can secure stability needed when supporting the positive temperature coefficient thermistor element 2 by the springs 6a and 6b.

As mentioned above, in each of the metal terminals 3a and 3b, the single supporting member 7 having a width W3, which is substantially equal to widths W1 and W2 of the springs 6a and 6b, is arranged between the springs 6a and 6b. Thus, the width W3 of the supporting member 7 is preferably reduced to about ½ of the total width value of the widths W1 and W2 of the springs 6a and 6b, so that the metal terminals 3a and 3b are miniaturized.

The metal terminals 3a and 3b are preferably formed by stamping out a stainless plate (such as, SUS 304) having a thickness of, for example, about 0.25 mm. The widths W1 and W2 of the springs and the width W3 of the supporting member are preferably about 1 mm.

The connecting portions 9 arranged at the upper ends of the metal terminals 3a and 3b engage with engaging portions 10 disposed on inner walls of the main body 4 to be retained at predetermined positions so that the connecting portions 9 are not separated from the inner walls of the main body 4. Additionally, the metal terminals 3a and 3b have stoppers 11, which abut with the lower surface of the main body 4 when the metal terminals 3a and 3b are inserted in the main body 4. In other words, the connecting portions 9 engage with the engaging portions 10 disposed on upper portions of the inner walls of the main body 4 and the stoppers 11 abut with the lower surface of the main body 4. With this arrangement, the two portions of each of the metal terminals 3a and 3b engage with the main body 4, with the result that the predetermined positional relationship between the terminals 3a and 3b and the main body 4 can be securely maintained.

In the positive temperature coefficient thermistor of the present preferred embodiment, the width W3 of the supporting member 7 is preferably reduced to approximately ½ of the total value (W1+W2) of the widths W1 and W2 of the springs 6a and 6b, thereby reducing the sizes of the metal terminals 3a and 3b. On the other hand, the connecting portions 9 arranged at the upper ends of the metal terminals 3a and 3b engage with the engaging portions 10 of the main body 4 to be retained. In addition, the lower portions of the metal terminals 3a and 3b inside the case 1 pass through the slits 4c in the bottom of the main body 4 to allow the stoppers 11 to abut with the lower surface of the main body 1, so that the lower portions of the metal terminals 3a and 3b are retained at predetermined positions. Thus, even when the springs 6a and 6b support the positive temperature coefficient thermistor element 2 interposed therebetween, the supporting members 7 are not deformed and thereby the springs 6a and 6b supported by the supporting members 7 can securely retain the positive temperature coefficient thermistor element 2 interposed between the springs 6a and 6b.

Since the connecting portions 9 of the metal terminals 3a and 3b engage with the engaging portions 10 to be retained and the stoppers 11 abuts with the lower surface of the main body 4, the two points of each of the metal terminals 3a and 3b consequently engage with the main body 4. With this arrangement, the distance between the metal terminals 3a and 3b can be securely and steadily maintained. Accordingly, the positive temperature coefficient thermistor can be easily mounted on a substrate.

Figure 4:
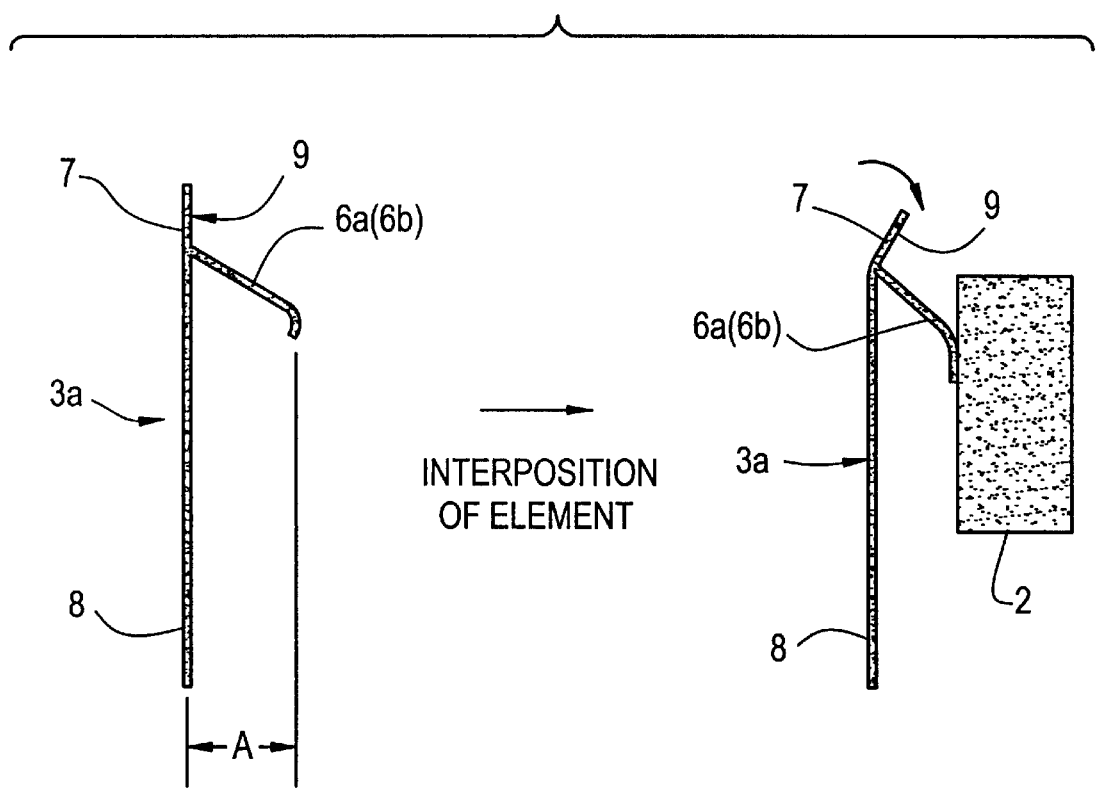
FIG. 4 illustrates the deformation of a supporting member of each metal terminal occurring when a connecting portion of the metal terminal is not retained.

In the arrangement in which the connecting portions 9 of the metal terminals 3a and 3b are not retained by the engaging portions 10, when the positive temperature coefficient thermistor element 2 is interposed between the springs 6a and 6b, the supporting member 7 of each of the metal terminals 3a and 3b is deformed as shown in FIG. 4. As a result, the springs 6a and 6b cannot retain the positive temperature coefficient thermistor element 2 with a sufficient spring thrusting force. This reduces the reliability that is required to support the positive temperature coefficient thermistor element 2.

Each of the metal terminals 3a and 3b used in the positive temperature coefficient thermistor of the present preferred embodiment preferably has the two springs 6a and 6b in addition to the single supporting member 7. Accordingly, the reliability of electrical continuity to the positive temperature coefficient thermistor element 2 and the current capacity of portions contacted with the positive temperature coefficient thermistor element 2 can be sufficiently maintained.

Furthermore, in this positive temperature coefficient thermistor, the connecting portions 9 of the metal terminals 3a and 3b engage with the engaging portions 10 of the main body 4 to be retained at predetermined positions. Thus, for example, when compared with the case in which the supporting members of the metal terminals are insert-molded inside the main body, the entire structure of the positive temperature coefficient thermistor and its manufacturing process can be greatly simplified, thereby leading to significant cost reduction.

Figure 5:
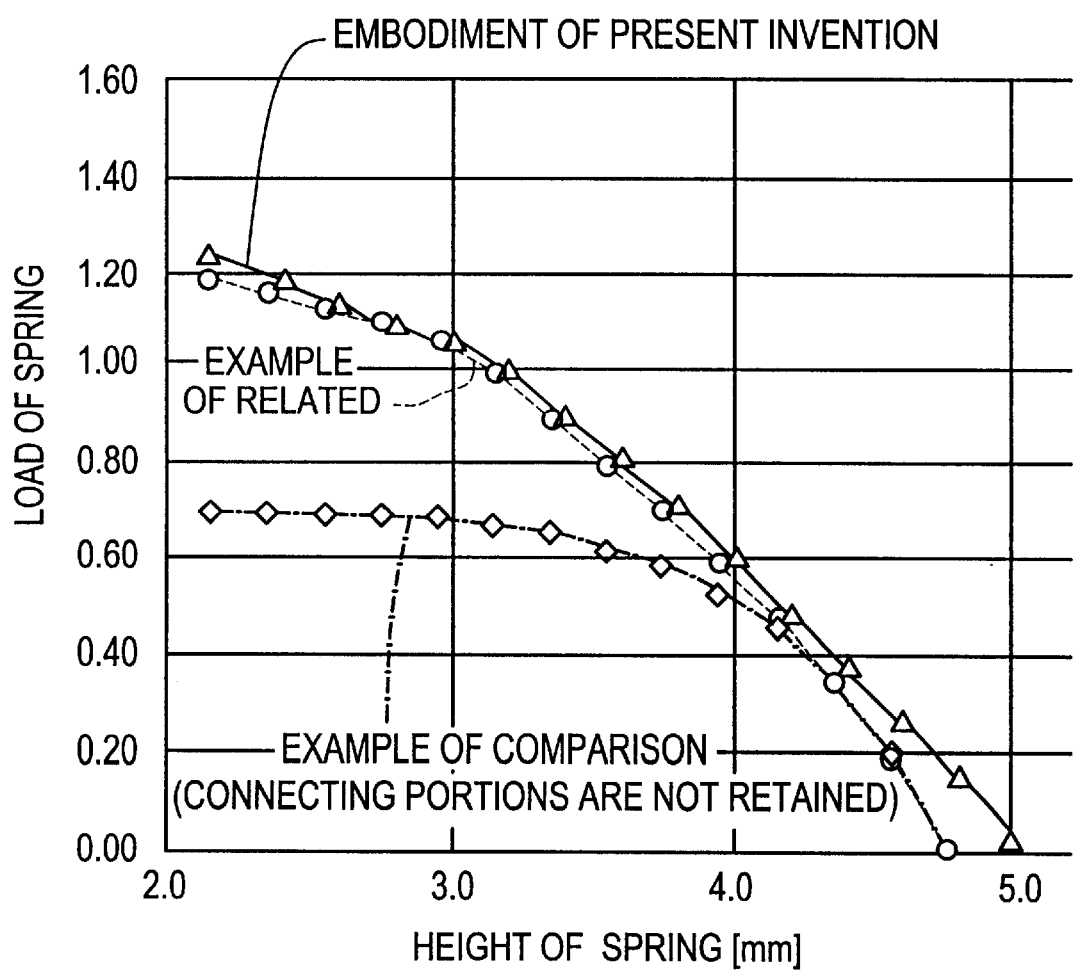
FIG. 5 is a graph showing spring characteristics of the metal terminal of the positive temperature coefficient thermistor.

FIG. 5 shows spring characteristics of the metal terminals 3a and 3b of the above-described preferred embodiment, in which the connecting portions 9 engage with the engaging portions 10 to be retained. That is, FIG. 5 shows the relationship between the height and load of each spring.

Figure 6:
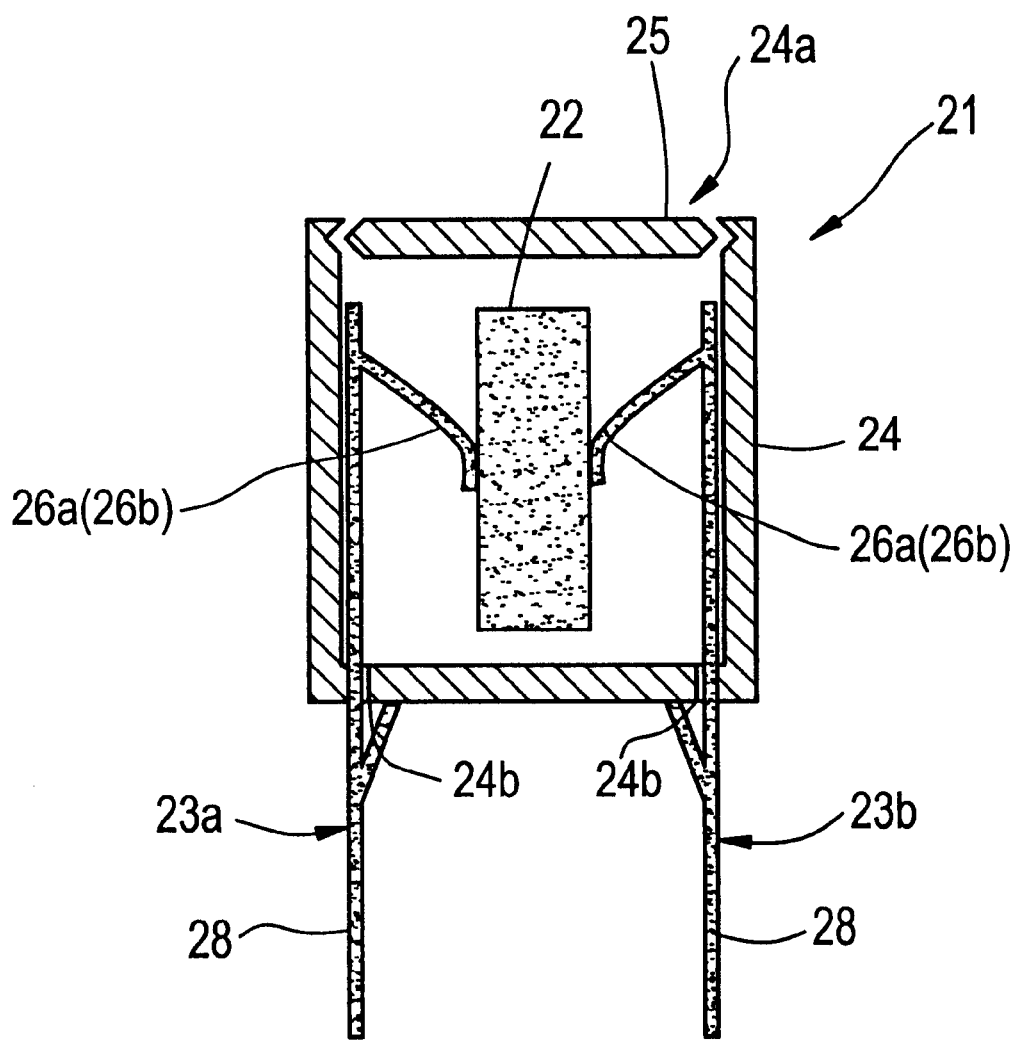
FIG. 6 is a sectional view of a positive temperature coefficient thermistor as an example of the related art.
Figure 7:
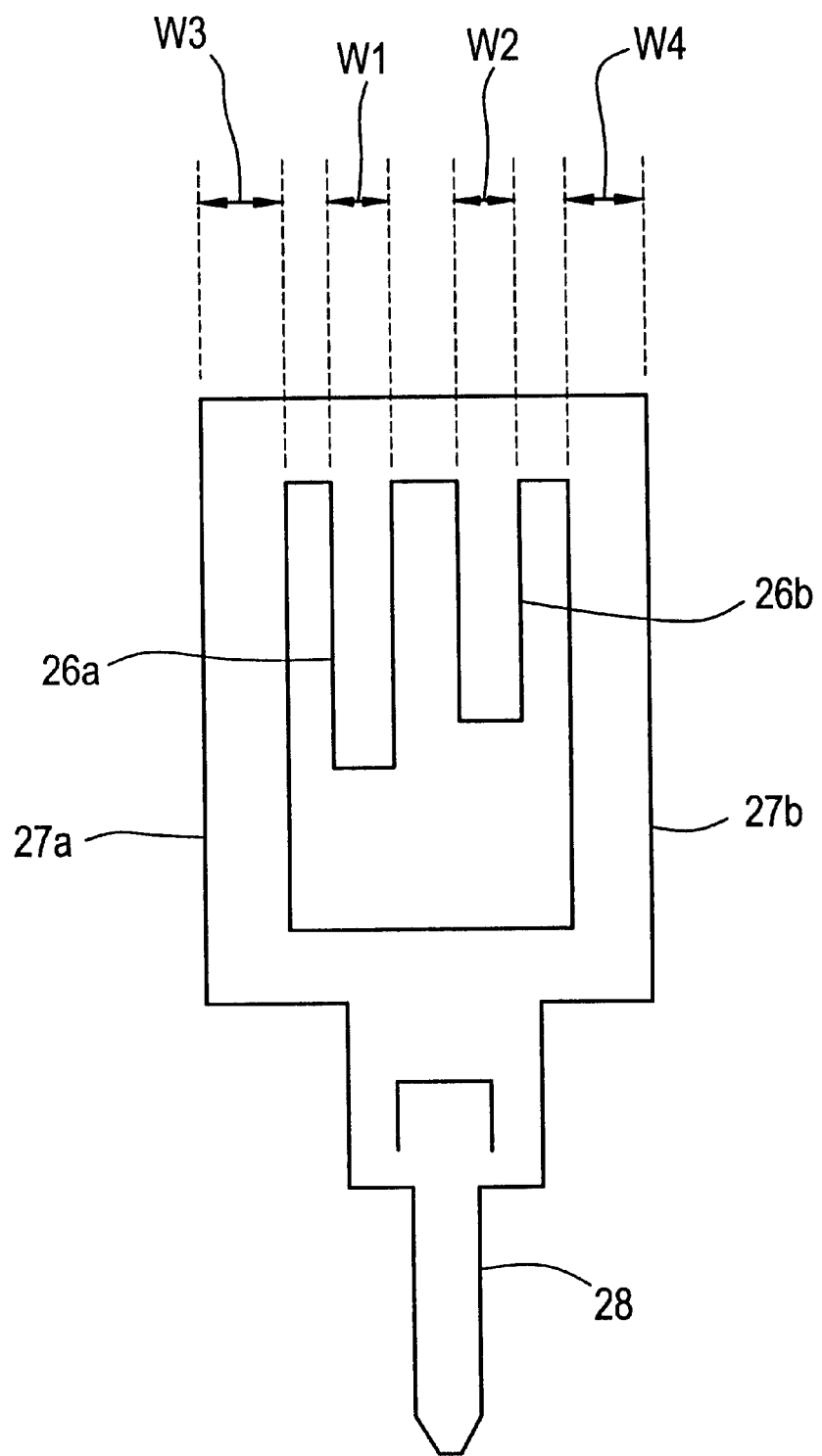
FIG. 7 is an illustration of a metal terminal used in the positive temperature coefficient thermistor shown in FIG. 6.
Figure 8:
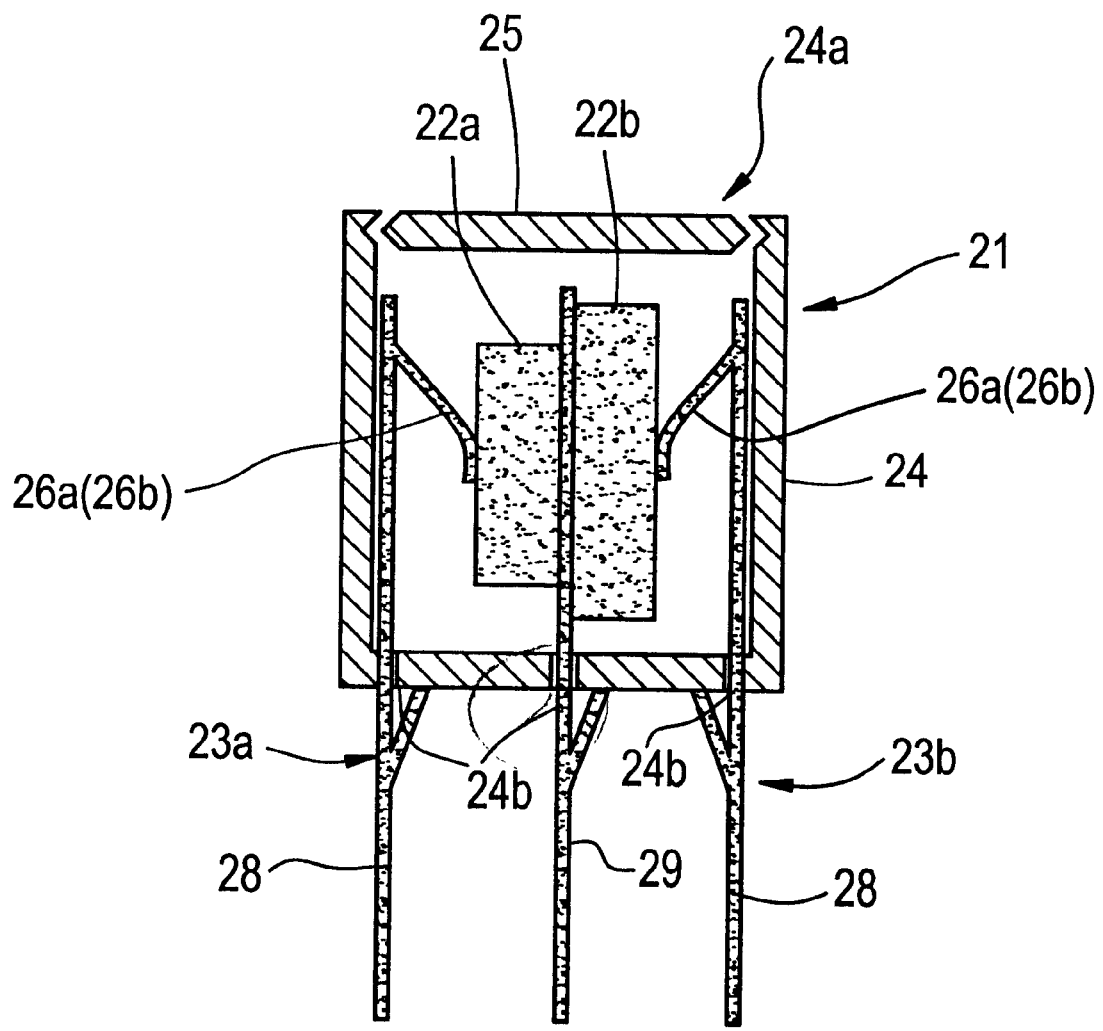
FIG. 8 shows a positive temperature coefficient thermistor as another example of the related art.

For comparison, there are additionally shown the spring characteristics of the metal terminals 3a and 3b obtained when the connecting portions 9 are not retained (a compared example) and the spring characteristics of the metal terminals as shown in FIGS. 6 and 7 (example of the related art), that is, the spring characteristics of the metal terminals obtained when two supporting members 27a and 27b are provided and the total value of the widths W3 and W4 of the supporting members 27a and 27b is larger than the total value of the W1 and W2 of the springs 26a and 26b.

"Spring height" indicated by the lateral axis in FIG. 5 represents a distance indicated by a symbol A in FIG. 4, which is a distance between base ends of the springs 6a and 6b (connecting portions 9 of the metal terminals 3a and 3b) and the top ends of the springs 6a and 6b (portions of the springs 6a and 6b in contact with the positive temperature coefficient thermistor element 2). That is, the distance is substantially equivalent to the vertical distance from the supporting member 7 to the top ends of the springs 6a and 6b.

As shown in FIG. 5, obviously, even when using the metal terminals 3a and 3b, each of which has the single supporting member 7 having a width W3 that preferably is about ½ of the total value (W1+W2) of the widths W1 and W2 of the springs 6a and 6b, the same spring characteristics as those shown in the example of the related art can be obtained in the positive temperature coefficient thermistor of the above-described preferred embodiment in which the upper-end connecting portions 9 engage with the engaging portions 10 to be retained.

In other words, in the positive temperature coefficient thermistor of the above-described preferred embodiment, although there is provided only one supporting member 7 having a width W3 of, for example, approximately 1 mm, the same spring characteristics can be obtained as those obtained in the example of the related art using the metal terminals 23a and 23b (FIG. 7), each of which includes the two supporting members 27a and 27b having the widths W1 and W2 of 1.9 mm, in which the total of the W1 and W2 is 3.8 mm.

In addition, it was discovered that even when using metal terminals like the metal terminals 3a and 3b of the above-described preferred embodiment, the spring characteristics are deteriorated when the upper-end connecting portions are not retained as with the compared example.

With the above results, in preferred embodiments of the present invention, without deteriorating the spring characteristics, the metal terminals can be significantly miniaturized, so that cost reduction of the product can be achieved.

In the preferred embodiment described above, the metal terminals preferably have the two springs and the single supporting member. However, the present invention is not restricted to this example. For example, there may be three or more springs and two or more supporting members provided. Alternatively, the numbers of springs and supporting members may be equal and the total width value of the supporting members may be smaller than the total width value of the springs.

In addition, in the preferred embodiment described above, although the connecting portions of the metal terminals engage with the engaging portions disposed on the inner walls of the main body, alternatively, the engaging portions may be disposed on the cover member and thereby the connecting portions of the metal terminals may engage with the engaging portions on the cover member.

In addition, in preferred embodiments described above, although the two springs have different lengths, they may be the same.

Furthermore, each of the metal terminals used in preferred embodiments described herein is preferably formed by stamping out a stainless plate. However, the metal terminals may be formed by other methods.

In addition, in preferred embodiments described herein, as an example of positive temperature coefficient thermistor, the description has been given of a demagnetizing positive temperature coefficient thermistor for use in a demagnetization circuit incorporated in a color television set or other electronic apparatus. However, the present invention is not restricted to this case and can be applied to various positive temperature coefficient thermistors.

Furthermore, regarding various points, the present invention is not restricted to the above-described preferred embodiments. Various modifications and changes may be made within the scope of the invention.

As described above, the positive temperature coefficient thermistor of preferred embodiments of the present invention includes the pair of metal terminals having springs supporting a positive temperature coefficient thermistor element interposed therebetween, at least one supporting member supporting the springs of each metal terminal, and a connecting terminal extending outside the case after passing through each slit formed in the bottom of the main body of the case. The total width value of the supporting members is preferably smaller than the total width value of the springs. In addition, the upper-end connecting portions of the metal terminals engage with the case main body or the cover member to be retained at predetermined positions. With this arrangement, even when the width of the supporting member is narrower than the total width of the springs to miniaturize the metal terminals, deformation of the supporting member can be prevented. As a result, since the springs can be securely supported, the reliability required to support the positive temperature coefficient thermistor element, the reliability of electrical continuity to the positive temperature coefficient thermistor element, and the current capacity of the portions where the springs are in contact with the positive temperature coefficient thermistor can be sufficiently maintained.

In addition, in the positive temperature coefficient thermistor of preferred embodiments of the present invention, the connecting portions of the metal terminals engage with the case main body or the cover member to be retained at predetermined positions. Thus, for example, when compared with the case in which the supporting members of the metal terminals are insert-molded inside the main body, the entire structure of the device and its manufacturing process are greatly simplified. Accordingly, significant cost reduction can be achieved.

In addition, in this invention, when each of the metal terminals includes two or more springs and supporting members that are fewer in number than the springs, the metal terminals can be sufficiently miniaturized. With the use of the two or more springs, both the reliability required to support the positive temperature coefficient thermistor element and the reliability of electrical continuity to the positive temperature coefficient thermistor element can be maintained. In the present invention, alternatively, while setting the number of the springs and the number of the supporting members to be equal, the total width value of the supporting members may be smaller than the total width value of the springs.

Furthermore, with the use of the metal terminals formed by stamping out a metal plate having a spring-like property, the positive temperature coefficient thermistor can reliably retain the positive temperature coefficient thermistor element and obtain electrical continuity to the positive temperature coefficient thermistor element at low cost. As a result, the present invention is even more advantageous.

Moreover, the present invention applies a demagnetizing positive temperature coefficient thermistor incorporated in a demagnetization circuit and widely used in household electronic apparatuses such as a color television set. Although there is a strong demand for cost reduction in such a positive temperature coefficient thermistor, the present invention applying the demagnetizing positive temperature coefficient thermistor enables manufacturing of a low-priced positive temperature coefficient thermistor without sacrificing the reliability of the device.

While the present invention has been particularly shown and described with reference to preferred embodiments thereof, it will be understood by those skilled in the art that the foregoing and other changes in form and details can be made without departing from the spirit and scope of the present invention.

What is claimed is:

1. A positive temperature coefficient thermistor comprising:
    a positive temperature coefficient thermistor element;
    a case including a main body having an open top portion and housing the positive temperature coefficient thermistor element therein, and a cover member attached to the open top portion of the main body; and
    at least one pair of metal terminals, each of said metal terminals including at least two springs downwardly extending from connecting portions at the upper ends of the at least two springs and arranged to be kept in contact with the positive temperature coefficient thermistor element by spring thrusting forces so as to achieve electrical continuity to the positive temperature coefficient element and supporting the positive temperature coefficient thermistor element interposed between the at least two springs to retain the positive temperature coefficient element inside the case, at least one supporting member having an upper end that is integrated with the connecting portions to support the at least two springs, and at least one connecting terminal passing through slits formed in the bottom of the case so as to extend outside the case;
    wherein said at least one supporting member extends between said at least two springs such that the connecting portion of one of said at least two springs is directly connected to one side of the at least one supporting member and another of said at least two springs is directly connected to another side of the at least one supporting member;
    wherein a total width of the at least one supporting member is less than a total width of the at least two springs and the connecting portions at the upper ends of the at least two springs engage with one of the main body and the cover member so that the connecting portions are retained at predetermined positions; and
    wherein the total width of the at least one supporting member is defined as a dimension of the at least one supporting member which extends from one of the at least two springs to another of the at least two springs.

2. A positive temperature coefficient thermistor according to claim 1, wherein each of the metal terminals includes supporting members that are fewer in number than the springs.

3. A positive temperature coefficient thermistor according to claim 1, wherein each of the metal terminals includes a stamped metal plate having a spring-like property.

4. A positive temperature coefficient thermistor according to claim 1, wherein the positive temperature coefficient thermistor element is a demagnetizing positive temperature coefficient thermistor element for use in a demagnetizing circuit.

5. A positive temperature coefficient thermistor according to claim 1, wherein inner walls of the open top portion includes grooves arranged to engage with peripheral portions of the cover member so that the cover member covers the open top portion of the main body.

6. A positive temperature coefficient thermistor according to claim 1, wherein each of the metal terminals includes one of the supporting members that has a width that is about ½ of the total width of the springs.

7. A positive temperature coefficient thermistor according to claim 1, wherein the connecting portions are arranged at the upper ends of the metal terminals so as to engage with engaging portions disposed on inner walls of the main body.

8. A positive temperature coefficient thermistor according to claim 1, wherein the metal terminals have stoppers which abut with a lower surface of the main body when the metal terminals are inserted in the main body.

9. A positive temperature coefficient thermistor according to claim 1, wherein two separate portions of the metal terminals engage with the main body.

10. An electronic apparatus comprising:
    at least one positive temperature coefficient thermistor including:
        a positive temperature coefficient thermistor element;
        a case including a main body having an open top portion and housing the positive temperature coefficient thermistor element therein, and a cover member attached to the open top portion of the main body; and
        at least one pair of metal terminals, each of said metal terminals including at least two springs downwardly extending from connecting portions at the upper ends of the at least two springs an arranged to be kept in contact with the positive temperature coefficient thermistor element by spring thrusting forces so as to achieve electrical continuity to the positive temperature coefficient element and supporting the positive temperature coefficient thermistor element interposed between the at least two springs to retain the positive temperature coefficient element inside the case, at least one supporting member having an upper end that is integrated with the connecting portions to support the at less two springs, and at least one connecting terminal passing through slits formed the bottom of the case so as to extend outside the case;
        wherein said at least one supporting member extends between said at least two springs such that the connecting portion of one of said at least two springs is directly connected to one side of the supporting member and the connecting portion of another of said at least two springs is directly connected to another side of the supporting member;
        wherein a total width of the at least one supporting member is less than a total width of the at least two springs and the connecting portions at the upper ends of the at least two springs engage with one of the main body and the cover member so that the connecting portions are retained at predetermined positions; and
        wherein the total width of the at least one supporting member is defined as a dimension of the at least one supporting member which extends from one of the at least two springs to another of the at least two springs.

11. An electronic apparatus according to claim 10, wherein the electronic apparatus is a television set.

12. An electronic apparatus according to claim 10, wherein each of the metal terminals includes supporting members that are fewer in number than the springs.

13. An electronic apparatus according claim 10, wherein each of the metal terminals includes stamped metal plate having a spring-like property.

14. An electronic apparatus according to claim 10, wherein the positive temperature coefficient thermistor element is a demagnetizing positive temperature coefficient thermistor element for use in a demagnetizing circuit.

15. An electronic apparatus according to claim 10, wherein inner walls of the open top portion include grooves arranged to engage with peripheral portions of the cover member so that the over member covers the open top portion of the main body.

16. An electronic apparatus according to claim 10, wherein each of the metal terminals includes one of the supporting members that has a width that is about ½ of the total width of the springs.

17. An electronic apparatus according to claim 10, wherein the connecting portions are arranged at the upper ends of the metal terminals so as to engage with engaging portions disposed on inner walls of the main body.

18. An electronic apparatus according to claim 10, wherein the metal terminals have stoppers which abut with a lower surface of the main body when the metal terminals are inserted in the main body.

19. An electronic apparatus according to claim 10, wherein two separate portions of the metal terminals engage with the main body.

* * * * *